Sept. 13, 1938.  W. BARTSCH  2,129,985
FILTER CONTRIVANCE FOR THE REMOVAL OF IMPURITIES
FROM GASEOUS OR LIQUID MEDIA
Filed Aug. 15, 1936
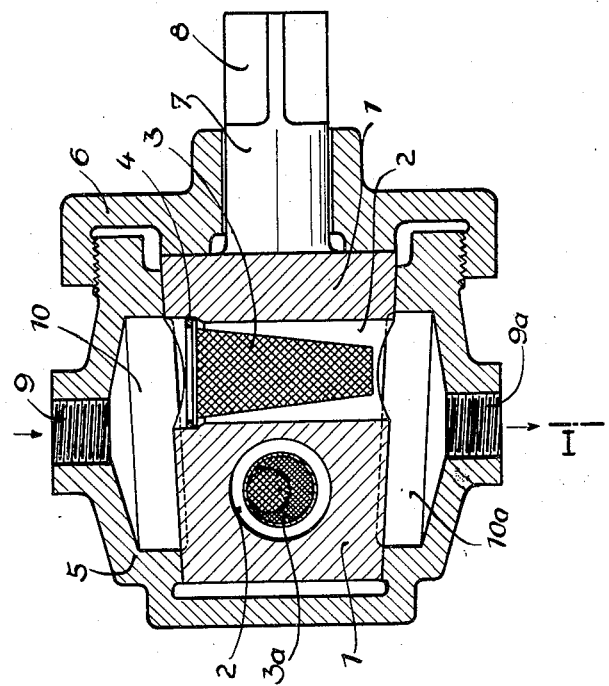
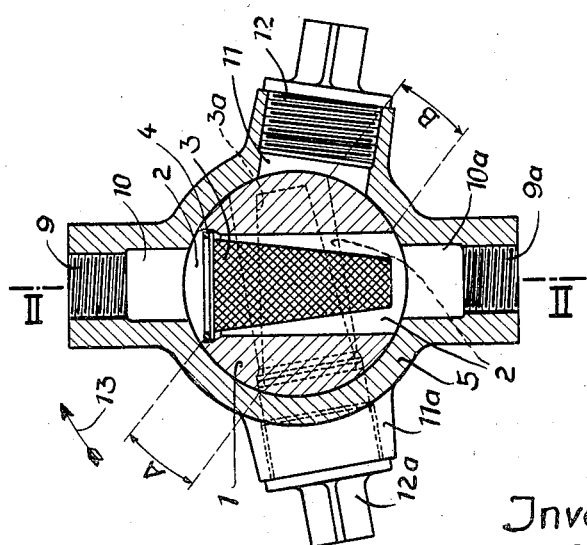
Inventor:
Walter Bartsch Patented Sept. 13, 1938

2,129,985

UNITED STATES PATENT OFFICE 2,129,985

FILTER CONTRIVANCE FOR THE REMOVAL OF IMPURITIES FROM GASEOUS OR LIQUID MEDIA

Walter Bartsch, Essen, Germany, assignor to "Wistra" Ofenbau-Gesellschaft m. b. H., Essen, Germany Application August 15, 1936, Serial No. 96,170
In Germany August 21, 1935

2 Claims. (Cl. 210—168)

This invention relates to filtering devices for removing impurities from liquids which are supplied to a point of consumption, for example, for cleaning oil supplied to an oil burner.

In order to secure an uninterrupted supply of liquid it is necessary to use two filter bodies which in the known devices of this type are disposed in separate branch pipes each provided with a special cut-off device and so arranged that a filter body can be taken out of operation at any time for the purpose of cleaning.

The object of the present invention is to provide a filtering device having a plurality of filtering bodies capable of alternative operation which are mounted in a common housing adapted to be interposed in a conduit or oil line, the arrangement being such that when a clean filtering body is moved into the operative position the used filtering body is brought into a position in which it is accessible for replacement or cleaning. In this way it is possible to obtain a permanent filtering action which is not interrupted when exchanging a filter requiring cleaning and which avoids the use of separate conduits or branch pipes.

According to the invention the filtering bodies are inserted in angularly-displaced diametrical holes formed in a plug member which is rotatably mounted in the filter housing so as to bring the filter bodies alternatively into operative position, the housing being formed with closable openings through which the filter body or bodies not occupying the operative position are accessible for replacement or cleaning.

Preferably, the housing and the plug member are so formed that in one position of the plug member the flow of liquid is cut off.

Reference will now be made to the accompanying drawing wherein one construction according to the invention is illustrated and in which:—

Figure 1 shows a cross-section on the line I—I of Figure 2; and

Figure 2 is a longitudinal section on the line II—II of Figure 1.

Filter bodies 3, 3a are inserted in obliquely disposed diametrical holes 2 in a cock plug 1 which is of conical construction, the filter bodies being preferably of basket shape and being maintained in place by spring rings 4. The plug 1 fits tightly into a housing 5 and is pressed into the housing by means of the cover 6 screwed on to the housing. The plug is adjusted by means of the extension of the pin 7 provided on the plug and formed with a square end 8. The housing 5 is provided with oppositely disposed holes 9, 9a leading into chambers 10, 10a which are widened in such a way that they are adapted to convey liquid to and from either of the filters 3, 3a whichever is in the operative position.

Extensions 11, 11a each having a central passage are also provided on the housing 5, said extensions being so arranged that when one filter lies in the flow direction 9, 9a, that is, in the operative position, the other lies opposite an extension 11 or 11a and so is accessible for replacement or cleaning. In the position shown on the drawing the filter 3 is in the flow direction 9, 9a and the filter 3a in front of the passage in extension 11a. On rotation of the plug 1 in the direction of the arrow 13, the filter 3a passes into the flow direction 9, 9a and the filter 3 is brought opposite the passage in extension 11. In operation the cleaning openings are closed by covers 12, 12a. In order that the supply of liquid may be entirely cut off it is sufficient to rotate the plug of the cock to such an extent that the sections of surface A, B, on the whole length of the plug, which have no holes, lie in front of the housing passage openings 9, 9a.

The operation of the filtering device according to the invention is as follows:—

The liquid coming in through the opening 9 flows through the filter 3 and the opening 9a into the adjoining pipe, not shown. If the filter 3 becomes dirty and requires cleaning the plug 1 is rotated in the direction of the arrow 13 by means of a key provided on the squared end 8 of the plug, until the filter 3a lies in the direction of flow 9, 9a and simultaneously the filter 3 lies in front of the cleaning opening 11. After the removal of the plug 12 the filter 3 is withdrawn, cleaned and reinserted and after a certain operative period it is again brought into the flow direction 9, 9a by turning the plug in the opposite direction to the arrow 13 whereby the filter 3a through which the liquid flowed previously again lies in front of the cleaning opening 11a and can likewise be cleaned.

Having now particularly described and ascertained the nature of my said invention and in what manner the same is to be performed, I declare that what I claim is:—

1. A filtering device comprising a casing having inlet and outlet openings, a plug member rotatably mounted within said casing and having a plurality of transverse holes adapted alternatively to place said inlet and outlet openings in communication, and basket shaped filter members mounted in said transverse holes, said transverse holes being spaced apart longitudinally of said plug member and obliquely disposed relative to each other, said casing having openings for permitting access to said filters when in inoperative position, and said plug being adapted, in one position, to close off said outlet opening from said inlet opening.

2. A filtering device comprising a casing having inlet and outlet openings, a plug member rotatably mounted within said casing and having a plurality of transverse holes adapted alternatively to place said inlet and outlet openings in communication, and filter members mounted in said transverse holes, said transverse holes being spaced apart longitudinally of said plug member and angularly displaced relative to each other, said casing having openings for permitting access to said filters when in inoperative position, said last openings being arranged one on either side of a plane intersecting said inlet and outlet openings and containing the axis of said plug.

WALTER BARTSCH.